United States Patent
Hoshiba et al.

(10) Patent No.: US 6,732,576 B2
(45) Date of Patent: *May 11, 2004

(54) LUBRICATION SYSTEM MALFUNCTION WARNING SYSTEM FOR MARINE PROPULSION UNITS

(75) Inventors: Akihiko Hoshiba, Hamamatsu (JP); Yasuo Suganuma, Hamamatsu (JP)

(73) Assignee: Yamaha Marin Kabushiki Kaisha, Shizuoka-ken (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/311,184

(22) Filed: May 13, 1999

(65) Prior Publication Data

US 2002/0011098 A1 Jan. 31, 2002

(30) Foreign Application Priority Data

May 13, 1998 (JP) .............................. 10-129812

(51) Int. Cl.$^7$ .............................................. G01M 15/00
(52) U.S. Cl. ..................................................... 73/118.1
(58) Field of Search ................. 73/116, 117.2, 73/117.3, 118.1, 40, 46, 47, 49.7; 340/438, 450, 450.3

(56) References Cited

U.S. PATENT DOCUMENTS

| | | | | |
|---|---|---|---|---|
| 3,723,964 | A | * | 3/1973 | Lace |
| 4,021,794 | A | * | 5/1977 | Carlson |
| 4,328,480 | A | * | 5/1982 | Keitel et al. |
| 4,480,602 | A | * | 11/1984 | Kobayashi et al. |
| 4,489,311 | A | * | 12/1984 | Lang et al. |
| 4,504,819 | A | * | 3/1985 | Hosoya |
| 4,572,120 | A | * | 2/1986 | Matsumoto |
| 4,615,305 | A | * | 10/1986 | Matsumoto |
| 5,229,745 | A | * | 7/1993 | Koide et al. |
| 5,555,857 | A | * | 9/1996 | Kanno ........................ 73/290 R |
| 5,987,975 | A | * | 11/1999 | Rafei ......................... 73/117.2 |

* cited by examiner

Primary Examiner—Eric S. McCall
(74) Attorney, Agent, or Firm—Knobbe, Martens, Olson & Bear, LLP.

(57) ABSTRACT

An outboard motor has a lubricant pump driven by an engine. The lubrication pump circulates lubricant to moving components of the engine through at least one lubricant passage. A pressure sensor is provided along the lubricant passage. The pressure sensor outputs a signal to an evaluator to determine whether a low pressure situation indicative of a malfunction has occurred. An alarm is activated based upon the determination of a malfunction. Activation of the alarm may occur if the engine is not warmed-up, if the engine is operating at a steady speed or encountering slow speed changes or has encountered a rapid speed change for a predetermined period of time. In this manner, false alarms related to pressure variations within the lubricant system may be reduced.

33 Claims, 4 Drawing Sheets

LUBRICATION SYSTEM MALFUNCTION WARNING SYSTEM FOR MARINE PROPULSION UNITS

BACKGROUND OF THE INVENTION

1. Field of the Invention

The present invention generally relates to malfunction warning systems for watercraft having outboard motors. More specifically, the present invention relates to control units capable of reducing false alarms in lubrication system malfunction detection systems.

2. Description of Related Art

Outboard motors pose unique challenges to engine designers due to their orientation and the rotation of the engines about a tilting and trimming axis during operation. One such challenge involves supplying lubricant to the moving components of the engine during a variety of operating conditions. Because the engine does change in orientation during use, accurately sensing a level of lubricant remaining in an oil pan becomes difficult, if not impossible. Such a measurement is desirable to ensure that the engine is not run dry of lubricant because of a leak or passage clogging.

In some outboard motors, the engine has a pressure sensor that detects a decrease in lubricant by evaluating the operating pressure within the lubrication system. If the pressure falls to a level indicative of a malfunction, then a buzzer or other alarm immediately sounds. One difficulty in such sensors is determining whether the low pressure is indicative of an actual problem or, rather, is indicative of a sudden change in operating conditions. For instance, due to the viscous nature of oil as a lubricant, the pressure of the lubricant does not vary as rapidly as engine speed. Accordingly, upon rapid acceleration, the lubricant pressure may incorrectly indicate a low pressure and a nonexistent malfunction.

Some engine designers have remedied these false alarm problems by setting the sensor to indicate a problem only when the pressure falls below a minimum pressure that corresponds to an adequate supply of lubricant during idle speed operation. Such a setting, however, allows the engine to operate at high speeds with inadequate lubrication, thereby reducing the durability and life span of the engine.

SUMMARY OF THE INVENTION

Accordingly, a system is desired that can decrease the number of false alarms while simultaneously protecting the engine during high speed operation.

One aspect of the present invention involves a malfunction detection system for use in a lubrication system of an engine of an outboard motor. The system comprises sensing an engine speed, sensing a rate of change in engine speed, and sensing a pressure in the lubrication system. The system determines if the sensed pressure is below a minimum pressure indicative of a malfunction in the lubrication system and activates an alarm procedure if the sensed pressure is below the pressure indicative of a malfunction in the lubrication system. The system also delays the alarm procedure if the engine is in a period of rapid change in engine speed.

Another aspect of the present invention involves an outboard motor comprising an engine and a lubricant pump powered by the engine. The lubricant pump is capable of pumping lubricant through a lubricant supply passage. Preferably, a pressure sensor is positioned along the supply passage and the pressure sensor is in communication with a control unit. In the illustrated embodiment, the control unit is capable of activating an alarm sequence when the pressure sensor emits a signal indicative of an abnormally low pressure within the supply passage and the control unit delays activating the alarm sequence when the engine is in a period of rapid engine speed change.

BRIEF DESCRIPTION OF THE DRAWINGS

These and other features, aspects and advantages of the present invention will now be described with reference to the drawings of a preferred embodiment, which embodiment is intended to illustrate and not to limit the invention, and in which figures.

DETAILED DESCRIPTION OF THE PREFERRED EMBODIMENTS OF THE INVENTION

Figure 1:
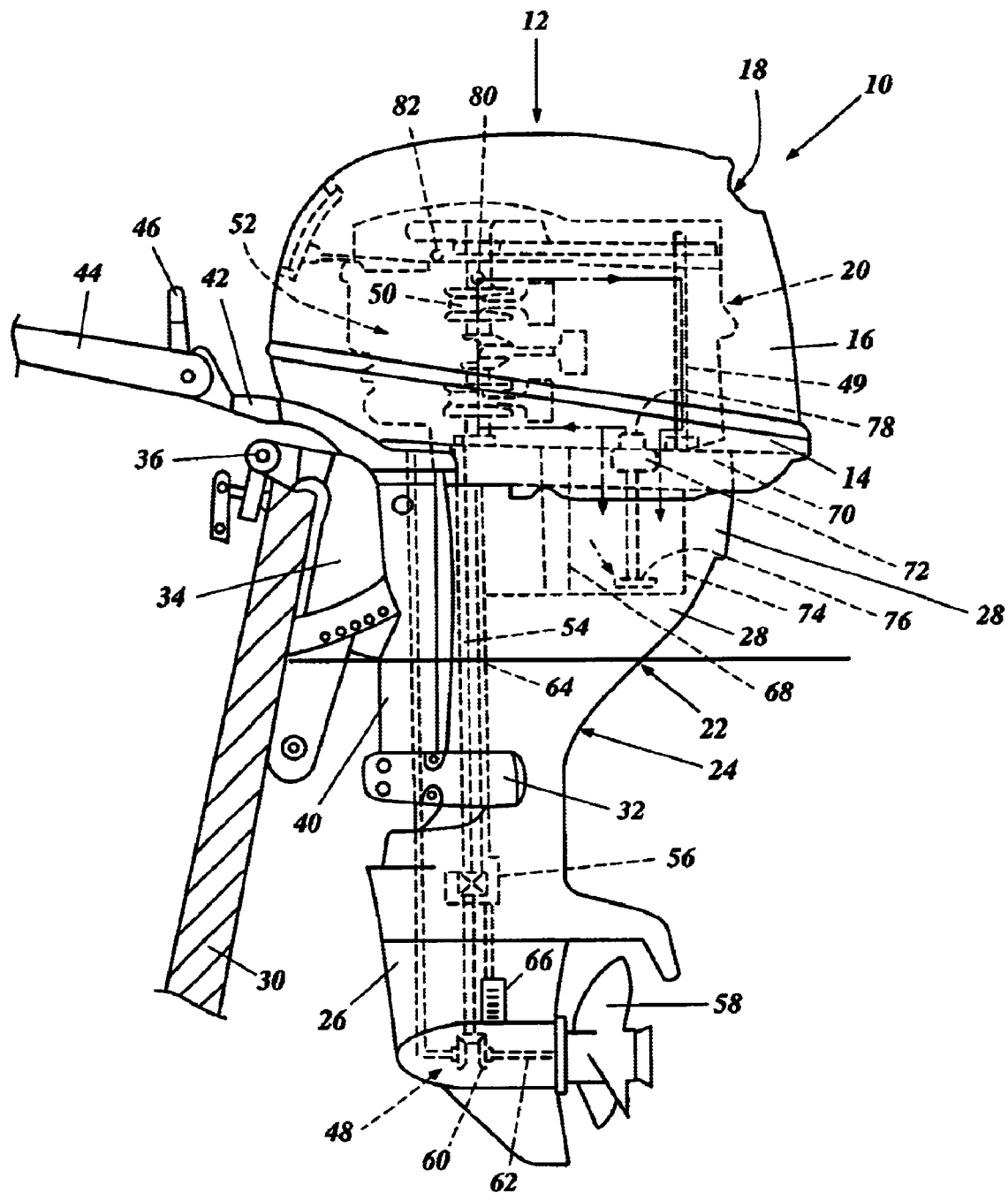
FIG. 1 is a side view of an outboard motor with certain internal components illustrated with hidden lines and a watercraft transom illustrated in section.

With initial reference to FIG. 1, an outboard motor for powering watercraft is illustrated. The outboard motor, indicated generally by the reference numeral 10, advantageously has a control system arranged and configured in accordance with certain features, aspects and advantages of the present invention. The outboard motor 10 provides an exemplary environment in which the control system has particular utility. The control system may also find utility in applications having engines that experience rapid fluctuations in lubrication system pressures and reservoirs that may experience significant sloshing or reorientation, such as, for example but without limitation, off-road vehicles, circle-track racing vehicles and heavy construction equipment.

With continued reference to FIG. 1, the illustrated outboard motor 10 generally comprises a power head 12 having a lower tray portion 14 and an upper cowling portion 16. The power head components may be manufactured of any suitable material, including, without limitation, reinforced plastics, fiberglass and metals, in any known manner. The lower tray portion 14 and the upper cowling portion 16 preferably are joined together to form a power head area 12 that is substantially weatherproof and water spray resistant. For instance, a rubber seal (not shown) may be positioned in the joining region.

An air vent or air inlet area 18, which may be rearward facing, is provided in the illustrated upper cowling portion 16. Air may enter through the vent 18 for induction into an internal combustion engine 20 that is preferably arranged and encased within the power head 12. The air vent 18 may also allow heated air to be exhausted from within the power head 12 after circulation within the power head 12.

With continued reference to FIG. 1, the illustrated outboard motor 10 also includes a lower unit 22 extending downwardly from the lower tray portion 14 of the power head area 12. The illustrated lower unit 22 generally comprises an enlarged upper or drive shaft housing portion 24 and a narrower lower portion 26. Generally, the illustrated upper portion 24 is connected to the lower tray portion 14 through an apron 28, which encases the lower unit 22 and supports the lower tray portion 14.

The illustrated outboard motor is generally attached to a transom 30 of a watercraft (not shown) using a mount 32 and a bracket 34 as is well known in the art. This bracket 34 preferably enables both steering and tilt and trim such that the outboard motor 10 may be steered about a substantially vertical axis and tilted or trimmed about a substantially horizontal axis in manners well known to those skilled in the art. For instance, the bracket 34 may include a generally horizontally extending transverse tilt shaft 36. The tilt shaft 36 is preferably arranged and configured to allow tilting and trimming of the motor 10 in any known manner.

Additionally, the bracket 34 may include a swivel shaft (not shown), which is arranged to extend in a direction generally normal to the tilt shaft 36. The motor 10 is capable of being moved for steering about the swivel shaft. The illustrated swivel shaft is positioned within a rotatable tubular casing 40, which is preferably fixed to the outboard motor 10. In one embodiment, the swivel shaft is carried on bearings while in other embodiments the swivel shaft may be carried by bushings or the like. In the illustrated embodiment, the swivel shaft simply floats within the tubular casing 40.

The rotation of the tubular casing 40 relative to the swivel shaft (not shown) may be controllable using a steering handle 42 that is connected to an upper steering bracket 44 in any suitable manner. Movement of the steering handle 42 in the illustrated embodiment causes a corresponding movement in the steering bracket 44. The steering bracket 44 is fixed to the tubular casing 40 and enables an operator to control movement of the motor 10 relative to the watercraft for steering.

The steering handle 42 may also carry a shifting lever 46. In one embodiment, the shifting lever 46 is connected to a shiftable transmission 48, which will be discussed below.

With continued reference to FIG. 1, the engine 20 may be of any configuration that is substantially vertically oriented such that an axis of at least one camshaft 49 or a crankshaft 50 has an inclined or substantially vertical axis. For instance, the engine 20 may contain as few as one cylinder or more than two cylinders. In the illustrated embodiment, the engine 20 comprises two banks of three cylinders. Additionally, the engine 20 may also operate on any known operating principle. The illustrated engine 20 preferably operates on a four-cycle principle.

Rotational power from the engine 20 is obtained from a crankshaft 50 that is driven for rotation in a manner well known to those of ordinary skill in the art. The crankshaft 50 is preferably rotatably journaled within a crankcase chamber 52. The illustrated crankcase chamber 52 is defined in part by a crankcase cover (not shown).

The crankshaft 50 is preferably coupled to a driveshaft 54 in any suitable manner. Accordingly, the driveshaft 54 is powered for rotation by the engine 20 through the crankshaft 50. The rotation of the driveshaft 54, in turn, drives both a water pump 56 and a propeller 58 in the illustrated embodiment. The illustrated propeller 54 is driven in both a forward direction and a reverse direction through the shiftable transmission 48. In the illustrated embodiment, this shiftable transmission generally comprises a selectable bevel gear arrangement 60. The selectable bevel gear arrangement 60 preferably couples the drive shaft 54 to a propeller shaft 62 and the propeller 58. These components are journaled for rotation in any suitable manner, such arrangements being well known to those of ordinary skill in the art.

The illustrated motor 10 also comprises a cooling system. The cooling system generally includes a water supply conduit 64 through which cooling water is circulated within the engine and adjacent to an exhaust system. The cooling water is pumped from the surrounding body of water through a pickup 66 by the water pump 56 in the illustrated embodiment. The cooling water is then circulated through the conduits and water jackets and exhausted back into the surrounding body of water through a coolant discharge passage 68 in any manner. As will be appreciated by those of ordinary skill in the art, any suitable cooling system may be employed and, as such, further description of the present cooling system is deemed unnecessary.

The illustrated water discharge passage 68 extends through an exhaust guide plate 70. The exhaust guide plate 70 is preferably positioned below the engine 20 and incorporates an exhaust passage through which the exhaust gases are passed from the engine to the balance of the exhaust system.

With continued reference to FIG. 1, the illustrated motor 10 also features a lubricant supply system. The lubricant supply system generally comprises a lubricant pump 72 and a plurality of lubricant passages, conduits and galleries through which lubricant is supplied to various moving components of the engine 20. The system also comprises a lubricant pan 74, or return reservoir, such that lubricant may drain from the moving components into the pan 74. While the illustrated embodiment features a lubricant pan 74, it is anticipated that the present invention may be used with engines featuring a dry-sump arrangement as well as the illustrated wet-sump arrangement.

In the illustrated embodiment, the lubricant is drawn from within the lubricant pan 74 through a pick-up 76. As is known, the pick-up 76 may be provided with a mesh straining cover to remove some of the larger impurities prior to being cycled through the lubrication system. Preferably, the lubricant is then pumped by the lubricant pump 72 through a high-pressure pressure regulator, or pressure regulating valve, 78. The lubricant then may be provided to the bearings of the crankshaft 50 in any suitable manner. At an uppermost portion of the lubricant passages in the illustrated embodiment, the lubricant being pumped by the pump 72 communicates with a pressure sensor 80. The pressure sensor will be discussed in more detail below. The lubricant is then preferably supplied to the camshaft 49 and allowed to return to the lubricant pan 74 via return passages (indicated by the downwardly extending arrows in FIG. 1) as is well known to those of ordinary skill in the art. The sensor 80 also may be positioned in any of a number of other locations along the lubricant passages.

The engine also includes a temperature sensor 82 to gauge the operating temperature of the engine. Moreover, the engine comprises a throttle angle sensor 84 and an engine speed sensor 86. The sensors 80, 82, 84 and 86 output signals to an alarm control system 88 for use in a control strategy which will now be introduced with reference to FIG. 2. Each of the sensors 80, 82, 84 and 86 may be of any suitable construction and arrangement. Of course, other sensors also may be incorporated to report on operational characteristics of the engine and motor as desired.

Figure 2:
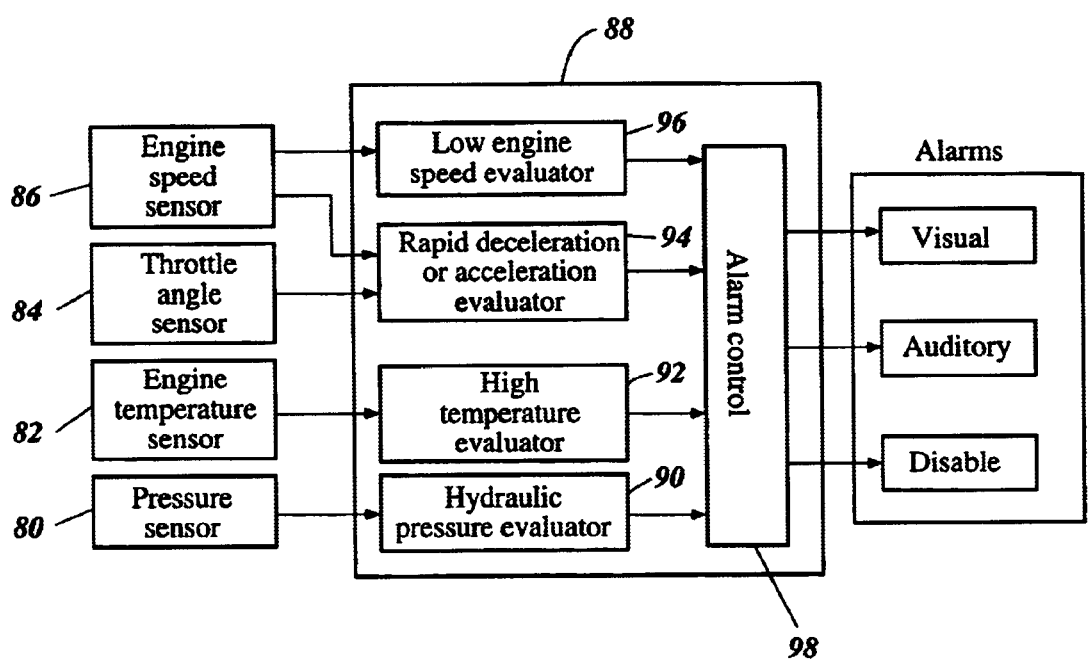
FIG. 2 is a block diagram illustrating an embodiment of a control unit having particular application in the present invention.

As illustrated in FIG. 2, the watercraft of the present embodiment features the alarm control system 88. The alarm control system 88 samples signals provided by a variety of sensors adapted to convey information about the engine's operational condition. In the illustrated embodiment of FIG. 2, the system 88 samples signals provided by the pressure sensor 80, the temperature sensor 82, the throttle angle sensor and the engine speed sensor 86. The illustrated system 88 then utilizes a variety of evaluators to determine specific information about the operating characteristics of the engine and motor.

For instance, the illustrated system utilizes a pressure evaluator 90 to determine whether an unusually low lubricant pressure exists within the lubrication system based upon the signal received from the lubricant pressure sensor 80. The illustrated system 88 also uses a high temperature evaluator 92 to determine whether the engine 20 has reached a warmed-up operational state and/or to determine whether the engine 20 is operating at a temperature indicative of a malfunctioning cooling system. Moreover, the illustrated system 88 uses a rapid acceleration or deceleration evaluator 94 to determine whether or not the engine is in a state of rapid acceleration or deceleration based, at least in part, upon the signals transmitted by the engine speed sensor 86 and the throttle angle sensor 84. Finally, the illustrated system 88 determines whether the engine is operating at a low engine speed using a low engine speed evaluator 96.

Each or any of these evaluators may be a comparator, a calculator, a logic circuit or the like. Moreover, the evaluators output a signal that is received by an alarm control 98 and manipulated in a manner to be described below. Based upon the outputs, the alarm control 98 can activate any or all of a number of alarms in the illustrated embodiment. The illustrated embodiment features visual alarms, auditory alarms and disabling arrangements. Of course, tactile alarms and other alarms suitable to transmit information regarding a malfunctioning system may also be used. Visual alarms may include, without limitation, lights and gauges. Auditory alarms may include, without limitation, buzzers, bells, sirens and the like. Disabling arrangements may, as will be recognized, selectively disable combustion within selected combustion chambers to slow engine speed or completely stop engine operation in any suitable manner.

Figure 3:
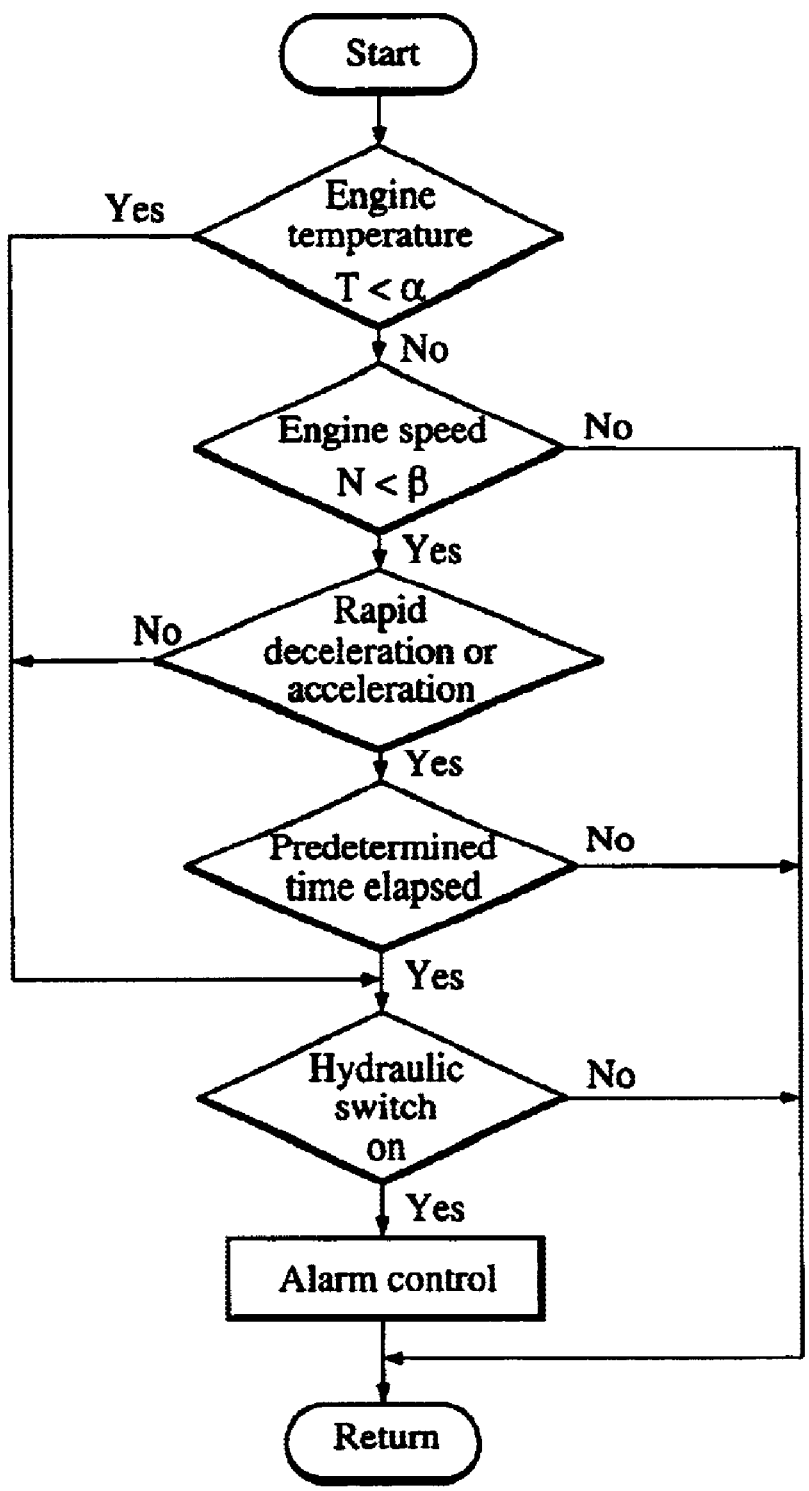
FIG. 3 is a flow diagram illustrating an embodiment of a control system having particular application in the present invention.

With reference now to FIG. 3, an exemplary routine for limiting false alarms will be described in detail. In the illustrated routine, the routine determines whether the engine has achieved a warmed-up temperature in a decision block. For instance, the actual temperature of the engine 20, as indicated by the temperature sensor 82, is compared to a temperature indicative of a warmed-up engine. If the engine temperature has exceed this predetermined temperature, α, then the routine continues on to check the engine speed, as described below. In the event the engine temperature has not exceeded this predetermined temperature indicative of the engine being adequately warmed-up, the routine proceeds to check the output of the lubricant pressure sensor 80, as will be described below.

Assuming for the instant that the temperature indicates that the engine has achieved a warmed-up operational condition, the routine checks the engine speed in a subsequent decision block. The engine speed is checked to ascertain whether the engine speed has fallen below a predetermined engine speed, such as, for example but without limitation, an engine speed indicative of idling, β. If the engine speed has not fallen to such a low speed, then the routine begins again.

In the event that the engine speed has decreased below the predetermined engine speed, which is indicative of a low-speed operating condition, then the routine determines whether the engine is in a condition of rapid acceleration or deceleration in a subsequent decision block. The output from both the throttle position sensor 84 and the engine speed sensor 86 are consulted by the evaluator 96 to make this determination in the illustrated embodiment. Other mechanical or electrical mechanisms, arrangements or routines may also be employed to determine whether the engine is in a state of rapid acceleration or deceleration.

If the engine is found to be in a state other than a state of rapid acceleration or deceleration, the routine passes to determine whether the lubricant pressure sensor is indicating a low pressure situation. In the event the engine is in a state of rapid speed change, the routine employs any of a number of counters or timers to determine whether a predetermined period of time has elapsed during which this rapid speed change condition is ongoing. For instance, the first pass during which a rapid speed change, an engine speed above the predetermined engine speed and an engine temperature above the predetermined temperature are encountered, a counter or timer is activated. As the routine continues to cycle through the steps, once a predetermined period has elapsed, then the routine will check whether a low lubricant pressure situation is present. Until the time has elapsed, the illustrated routine will bypass the decision block related to determining whether a low lubricant pressure is present.

The low lubricant pressure decision block is encountered in the illustrated embodiment under three circumstances. First, the engine has not warmed-up, in which case the lubricant has an increased viscosity and a low pressure reading is typically indicative of a problem. Second, the engine is in a state of steady speed or slow acceleration or deceleration, under such conditions, the pressure-generated by the lubricant pump should not have sudden increases or decreases and a low pressure reading would likely be indicative of a malfunction. Third, the engine is warmed-up, operating at a speed above a low-speed indicative speed, and rapidly changing in speed for a predetermined period. As explained above, the viscous nature of lubricant causes a slight lag in pressure resulting from quick changes in engine speed. Accordingly, in the third scenario, the time delay is utilized to allow the pump and the lubricant pressure to catch up after a sudden decrease or increase in engine speed. If the pressure remains low after a sufficient time delay, then a malfunction has likely occurred.

In the event the pressure sensor indicates a low pressure (i.e., the pressure switch is on in the illustrated embodiment), then an alarm is activated. The pressure sensor may be configured to be a switch positioned in either the on position or in the off position as a result of the low pressure detection. For instance, if the pressure sensor comprises a spring-loaded diaphragm subjected to oil pressure on one side and having a sensing element on the other, the deflection of the diaphragm may either open or close a pair of contacts against the force of the spring. Opening the contacts tends to place the switch in an off position while closing the contacts tends to place the switch in an on position. Thus, one of ordinary skill in the art can easily construct variations on the apparatus to have the same effect of transmitting a signal in the event of a low-pressure scenario.

While not depicted in the routine of FIG. 3, the routine may also feature a manual override to allow an operator to disable the alarm in select operating scenarios. Additionally, the illustrated routine simply activates the alarm if all of the conditions are met during each subsequent iteration through the routine; It is envisioned, however, that the routine may activate the alarm for a predetermined period, during which period the alarm is constantly activated regardless of the engine operating conditions. Following the predetermined period, the routine checks for a change in the conditions that will allow the alarm to continue to remain inactivated.

Figure 4:
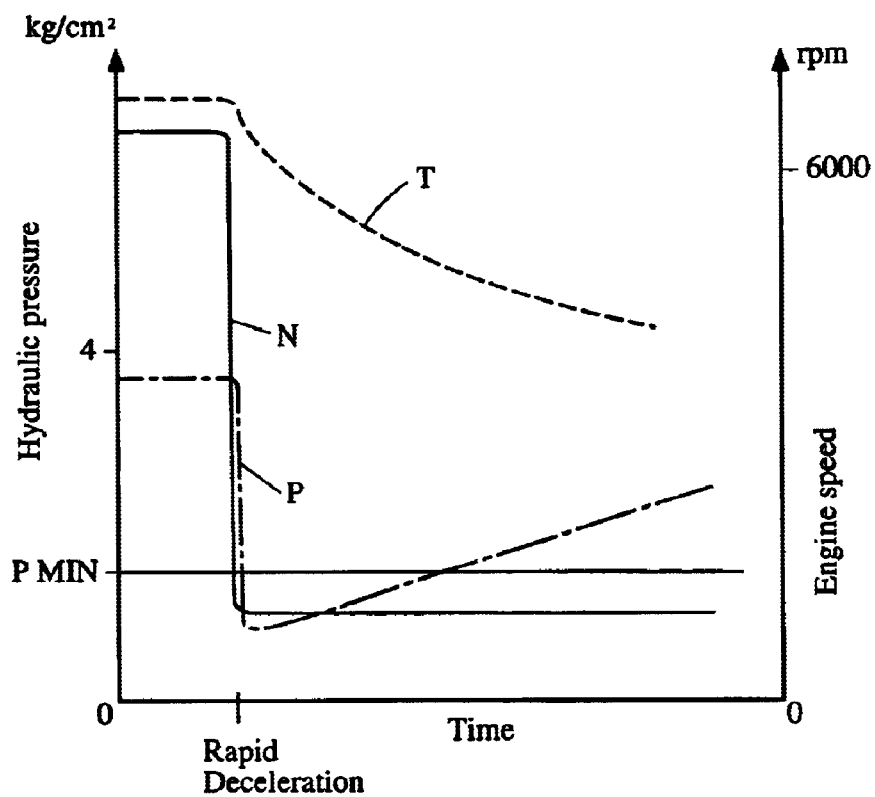
FIG. 4 is a graphical depiction of temperature, engine speed and lubrication system pressure over a range of time during rapid deceleration.

With reference now to FIG. 4, a graphical depiction of the engine temperature, speed and lubricant pressure is shown during a state of rapid deceleration. The graphical depiction illustrates that the sudden drop in engine speed, following warm-up, may result in a corresponding drop in lubricant pressure. Additionally, the graphical depiction illustrates that even while the engine speed remains low, the pressure within the lubrication system will begin to steadily rise as the inertia of the lubricant, which is caused, in part, by its viscosity, is slowly overcome. As the lubricant pressure overcomes the minimum pressure (as determined by the pressure required to adequately lubricate the engine at its highest speed in the illustrated embodiment), the alarm in the above-discussed routine would cease activation or would be deactivated.

Figure 5:
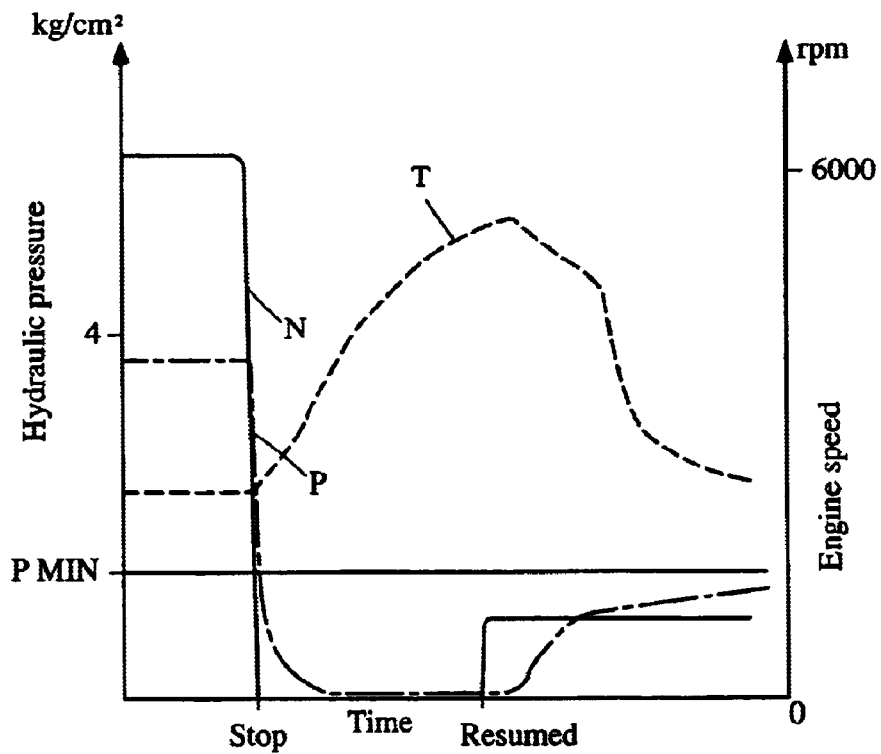
FIG. 5 is a graphical depiction of temperature, engine speed and lubrication system pressure over a range of time during engine stopping and rapid restarting.

With reference now to FIG. 5, a graphical depiction of the engine temperature, speed and lubricant pressure is shown as the engine encounters a rapid stop and restart scenario. In such a scenario, the engine is fully stopped and the pressure within the lubrication system gradually falls to zero over time. Due to the inertia of the lubricant, the engine in the illustrated embodiment ceases rotation of the crankshaft while the lubricant continues to flow through the system for a short period of time and the pressure slowly tails off. Similarly, upon restart, the engine almost instantaneously resumes a low speed operation while the lubricant's inertia must be overcome prior to the lubricant pressure rising as detected by the sensor. Steadily, after the initial increase, the lubricant pressure will increase to exceed the minimum pressure while the engine continues to operate at a low speed. In the illustrated embodiment, the alarm will continue to be activated until the lubricant pressure climbs above the minimum pressure.

As discussed above, the minimum pressure may be set as the minimum pressure for supplying adequate lubrication to the moving parts when the engine is running at a minimum engine speed, such as, for example but without limitation, idle speed. In one embodiment, the minimum pressure is approximately 0.1 kg/cm$^2$. In the illustrated embodiment, the pressure during normal steady-speed operation is approximately 4.0 kg/cm$^2$. In some preferred embodiments, the minimum pressure may be between about 0.5 kg/cm$^2$ and about 3.5 kg/cm$^2$. In other select embodiments, the minimum pressure may be between about 0.8 kg/cm$^2$ and about 1.5 kg/cm$^2$. In a presently preferred embodiment, the minimum pressure is approximately 1.0 kg/cm$^2$, or the pressure associated with protecting the moving parts at a highest operational speed, such as, for example but without limitation, 6000 rpm. At these pressures, the engine is advantageously supplied with sufficient lubrication to protect the moving components, such as, for example but without limitation, the piston rings, the crankshaft and the camshaft bearings under most operating conditions.

The routine of the present invention enables the minimum pressure to be set to adequately provide lubricant at substantially all engine speeds while accommodating rapid changes in engine speed and the corresponding variations in lubricant system pressure. The routine also accommodates the variability of lubricant viscosity and low speed operation of the engine.

Although the present invention has been described in terms of a certain embodiment, other embodiments apparent to those of ordinary skill in the art also are within the scope of this invention. Thus, various changes and modifications may be made without departing from the spirit and scope of the invention. Moreover, not all of the features, aspects and advantages are necessarily required to practice the present invention. Accordingly, the scope of the present invention is intended to be defined only by the claims that follow.

What is claimed is:

1. A malfunction detection method for use in a lubrication system of an engine of an outboard motor, the method comprising sensing an engine speed, sensing a rate of change in engine speed, sensing a pressure in the lubrication system, determining if the sensed pressure is below a minimum pressure indicative of a malfunction in the lubrication system, activating an alarm procedure if the sensed pressure is below the pressure indicative of a malfunction in the lubrication system, after a delay of a predetermined period of time from when a pressure below the minimum is sensed if the engine is in a period of change in engine speed sufficient to cause a measurable lag in lubricant pressure, and activating the procedure without said delay if the engine is not in the period of change.

2. The method of claim 1, wherein the alarm procedure comprises activating a buzzer until the sensed pressure rises above the minimum pressure.

3. The method of claim 1, wherein the alarm procedure comprises lighting a warning lamp.

4. The method of claim 1, wherein the minimum pressure is between about 0.5 kg/cm$^2$ and about 3.5 kg/cm$^2$.

5. The method of claim 1, wherein the minimum pressure is between 0.8 kg/cm$^2$ and about 1.5 kg/cm$^2$.

6. The method of claim 1, wherein the minimum pressure is approximately 1.0 kg/cm$^2$.

7. The method of claim 1 further comprising determining whether the engine is operating at a speed below a predetermined speed, and activating the alarm procedure if the engine is operating at a speed below the predetermined speed.

8. The method of claim 1 further comprising sensing an engine temperature, determining whether the engine is operating at a temperature below a predetermined temperature, and delaying the alarm procedure only if the engine is not operating at a temperature above the predetermined temperature.

9. A malfunction detection method for use in a lubrication system of an engine of an outboard motor, the method comprising sensing an engine speed, sensing a rate of change in engine speed, sensing a pressure in the lubrication system, determining if the sensed pressure is below a minimum pressure indicative of a malfunction in the lubrication system, activating an alarm procedure if the sensed pressure is below the pressure indicative of a malfunction in the lubrication system, delaying the alarm procedure for a predetermined period of time if the engine is in a period of change in engine speed sufficient to cause a measurable lag in lubricant pressure, determining whether the engine is operating at a speed below a predetermined speed, and activating the alarm procedure if the engine is operating at a speed below the predetermined speed.

10. The method of claim 9, wherein the predetermined speed is a speed corresponding to an idle speed.

11. The method of claim 9 further comprising sensing an engine temperature, determining whether the engine is operating at a temperature below a predetermined temperature, and delaying the alarm procedure only if the engine is not operating at a temperature below the predetermined temperature.

12. An outboard motor comprising an engine, a lubricant pump powered by the engine, the lubricant pump in communication with a lubricant supply passage, a pressure sensor positioned along the supply passage, the pressure sensor in communication with a control unit, the control unit activating an alarm sequence when the pressure sensor emits a signal indicative of an abnormally low pressure within the supply passage after a delay of a predetermined period of time from when the senor emits the signal when the engine is in a period of engine speed change sufficient to cause a measurable lag in lubricant pressure, the control unit also being configured to activate the alarm sequence without said delay if the engine is not in the period of engine speed.

13. The outboard motor of claim 12, wherein the control unit delays activating the alarm sequence only after the engine has reached a warmed-up operating condition, which is based upon a sensed operating temperature.

14. The outboard motor of claim 12, wherein the control unit delays activating the alarm sequence only after the engine is operating above a predetermined low-speed.

15. The outboard motor of claim 14, wherein the predetermined low-speed is an idle speed.

16. The outboard motor of claim 12, wherein the alarm sequence comprises activating at least one alarm selected from the group consisting of auditory alarms, visual alarms, tactile alarms, or combustion disabling alarms.

17. The outboard motor of claim 12, wherein the abnormally low pressure is a pressure lower than a pressure at which an adequate supply of lubricant is maintained to the engine during minimum engine speed.

18. The outboard motor of claim 12, wherein the abnormally low pressure is a pressure lower than a pressure at which an adequate supply of lubricant is a maintained to the engine during maximum engine speed.

19. The outboard motor of claim 12, wherein the engine speed change sufficient to cause a measurable lag in lubricant pressure is indicated by output from an engine speed sensor and a throttle angle sensor.

20. The outboard motor of claim 12, wherein the engine speed change sufficient to cause a measurable lag in lubricant pressure is indicated by fluctuations in output from an engine speed sensor.

21. The outboard motor of claim 12, wherein the engine speed change sufficient to cause a measurable lag in lubricant pressure is indicated by output from a throttle angle sensor.

22. A malfunction detection method comprising sensing an engine speed, sensing a rate of change in engine speed, sensing a pressure in the lubrication system, determining if the sensed pressure is below a minimum pressure indicative of a malfunction in the lubrication system, activating an alarm procedure if the sensed pressure is below the pressure indicative of a malfunction in the lubrication system, delaying the alarm procedure for a predetermined period of time if the engine is in a period of change in engine speed sufficient to cause a measurable lag in lubricant pressure, sensing an engine temperature, determining whether the engine is operating at a temperature below a predetermined temperature, and delaying the alarm procedure only if the engine is not operating at a temperature above the predetermined temperature.

23. A malfunction detection method for use in a lubrication system of an engine, the method comprising sensing an engine speed, determining whether the sensed speed is less than a predetermined speed, determining whether a rate of change in engine speed is greater than a predetermined rate of change, sensing a pressure in the lubrication system, determining whether the sensed pressure is below a minimum pressure indicative of a malfunction in the lubrication system, activating an alarm procedure if the sensed pressure is below the pressure indicative of a malfunction in the lubrication system, and delaying the alarm procedure for a predetermined period of time if the sensed speed is less than the predetermined speed and the rate of change in engine speed is greater than the predetermined rate of change.

24. The method of claim 23 additionally comprising sensing an engine temperature, determining whether the engine temperature is less than a predetermined temperature, and delaying the alarm procedure only if the engine temperature is not less than the predetermined temperature.

25. The method of claim 23, wherein the determining whether the rate of change in engine speed is greater than the predetermined rate of change is done based upon the sensed engine speed.

26. The method of claim 23 additionally comprising sensing a throttle angle, the determining whether the rate of change in engine speed is greater than the predetermined rate of change is done based upon the sensed throttle angle.

27. The method of claim 23, wherein the engine powers an outboard motor.

28. An engine comprising a lubricant pump powered by the engine, the lubricant pump in communication with a lubricant supply passage, a pressure sensor positioned along the supply passage, an engine speed sensor configured to sense an engine speed, an alarm device configured to alarm an abnormal low pressure condition in the lubricant supply passage, a control unit activating the alarm device when a signal from the pressure sensor is indicative of a lubricant pressure less than a predetermined pressure, the control unit delaying the activation of the alarm device for a predetermined period of time if a signal from the engine speed sensor is indicative of engine speed less than a predetermined speed and a rate of change in engine speed is greater than a predetermined rate of change.

29. The engine of claim 28 additionally comprising a temperature sensor configure to sense an engine temperature, the control unit activating the alarm device without delaying for the predetermined period of time if a signal from the temperature sensor is less than a predetermined temperature.

30. The engine of claim 28, wherein the control unit determines whether the rate of change in engine speed is greater than the predetermined rate of change based upon the signal from the engine speed sensor.

31. The engine of claim 28 additionally comprising a throttle angle sensor, the control unit determining whether the rate of change in engine speed is greater than the predetermined rate of change based upon the signal from the throttle angle sensor.

32. The engine of claim 28, wherein the engine powers an outboard motor.

33. An outboard motor comprising an engine, a lubricant pump powered by the engine, the lubricant pump in communication with a lubricant supply passage, a pressure sensor positioned along the supply passage, the pressure sensor in communication with a control unit, the control unit activating an alarm sequence when the pressure sensor emits a signal indicative of an abnormally low pressure within the supply passage after a delay of a predetermined period of time from when the senor emits the signal when the engine is in a period of engine speed change sufficient to cause a measurable lag in lubricant pressure.

* * * * *

UNITED STATES PATENT AND TRADEMARK OFFICE
CERTIFICATE OF CORRECTION

PATENT NO. : 6,732,576 B2
DATED : May 11, 2004
INVENTOR(S) : Hoshiba et al.

It is certified that error appears in the above-identified patent and that said Letters Patent is hereby corrected as shown below:

<u>Title page,</u>
Item [73], Assignee, delete "Marin" and insert therefore, -- Marine --

Signed and Sealed this

Third Day of August, 2004

JON W. DUDAS
*Acting Director of the United States Patent and Trademark Office*